United States Patent
Choi et al.

(10) Patent No.: US 11,876,219 B2
(45) Date of Patent: Jan. 16, 2024

(54) METHOD OF MANUFACTURING COMPOSITE ELECTRODE FOR ALL-SOLID-STATE BATTERY, AND COMPOSITE ELECTRODE FOR ALL-SOLID-STATE BATTERY MANUFACTURED THEREBY

(71) Applicants: HYUNDAI MOTOR COMPANY, Seoul (KR); Kia Corporation, Seoul (KR)

(72) Inventors: Sun Ho Choi, Incheon (KR); Yong Jun Jang, Seongnam-si (KR); In Woo Song, Gwacheon-si (KR); Sang Heon Lee, Yongin-si (KR); Sang Soo Lee, Goyang-si (KR); So Young Kim, Jeongeup-si (KR); Seong Hyeon Choi, Changwon-si (KR); Sa Heum Kim, Suwon-si (KR); Jae Min Lim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 83 days.

(21) Appl. No.: 17/407,844

(22) Filed: Aug. 20, 2021

(65) Prior Publication Data
US 2022/0302441 A1 Sep. 22, 2022

(30) Foreign Application Priority Data
Mar. 22, 2021 (KR) .................. 10-2021-0036595

(51) Int. Cl.
*H01M 4/36* (2006.01)
*H01M 10/0562* (2010.01)
(Continued)

(52) U.S. Cl.
CPC .......... *H01M 4/366* (2013.01); *H01M 4/0471* (2013.01); *H01M 10/0562* (2013.01); *H01M 2004/021* (2013.01); *H01M 2300/008* (2013.01)

(58) Field of Classification Search
CPC .............. H01M 4/366; H01M 4/0471; H01M 10/0562; H01M 2004/021;
(Continued)

(56) References Cited

U.S. PATENT DOCUMENTS

2015/0162614 A1* 6/2015 Koshika .................. H01M 4/13
429/189
2021/0249685 A1* 8/2021 Shibata .................... H01B 1/10

FOREIGN PATENT DOCUMENTS

KR 10-2090285 B 3/2020

* cited by examiner

*Primary Examiner* — Stewart A Fraser
(74) *Attorney, Agent, or Firm* — Morgan, Lewis & Bockius LLP

(57) ABSTRACT

A method of manufacturing a composite electrode for an all-solid-state battery includes: preparing a precursor solution by mixing at least one solid electrolyte precursor and at least one polar solvent; stirring the precursor solution; preparing an electrode slurry by adding an active material to the stirred precursor solution; and heat-treating the electrode slurry and obtaining the composite electrode for the all-solid-state battery, wherein the composite electrode for the all-solid-state battery includes: the active material; and a coating layer disposed on the active material and including a solid electrolyte.

10 Claims, 4 Drawing Sheets

(51) Int. Cl.
*H01M 4/04* (2006.01)
*H01M 4/02* (2006.01)

(58) Field of Classification Search
CPC .... H01M 2300/008; H01M 4/13; H01M 4/62; H01M 4/139; H01M 4/04; H01M 4/136; H01M 4/1397
See application file for complete search history.

METHOD OF MANUFACTURING COMPOSITE ELECTRODE FOR ALL-SOLID-STATE BATTERY, AND COMPOSITE ELECTRODE FOR ALL-SOLID-STATE BATTERY MANUFACTURED THEREBY

CROSS REFERENCE TO RELATED APPLICATION

The present application claims priority to and the benefit of Korean Patent Application No. 10-2021-0036595, filed on Mar. 22, 2021, the entire contents of which are incorporated herein by reference.

FIELD

The present disclosure relates to a method of manufacturing a composite electrode for an all-solid-state battery and a composite electrode for an all-solid-state battery manufactured thereby.

BACKGROUND

The statements in this section merely provide background information related to the present disclosure and may not constitute prior art.

As the demand for electric vehicles and large-capacity power storage devices increases, various batteries have been developed therefor.

In particular, among various secondary batteries, lithium secondary batteries have been widely commercialized because they have the greatest energy density and power output characteristics. A lithium secondary battery including a liquid-type electrolyte including an organic solvent (hereinafter referred to as a 'liquid-type secondary battery') has been mainly used.

However, in the liquid-type secondary battery, the liquid electrolyte is decomposed through the electrode reaction, causing the battery to expand, and the risk of ignition due to leakage of the liquid electrolyte has been pointed out. For this reason, a lithium secondary battery to which a solid electrolyte, having superior stability, is applied (hereinafter referred to as an 'all-solid-state battery') is receiving attention.

Meanwhile, solid electrolytes are classified into oxide-based solid electrolytes and sulfide-based solid electrolytes. Since a sulfide-based solid electrolyte has high lithium-ion conductivity compared to an oxide-based solid electrolyte and is stable over a wide voltage range, a sulfide-based solid electrolyte is mainly used as a solid electrolyte.

In a conventional method of manufacturing a composite electrode for synthesizing a sulfide-based solid electrolyte by applying the sulfide-based solid electrolyte on an active material, a composite electrode is manufactured through two steps including preparing a final solid electrolyte through heat treatment and coating an active material with a solution obtained by dissolving the solid electrolyte in a solvent.

However, the above manufacturing method is disadvantageous in that it is cumbersome to perform two steps, the processing time is long, and applicability thereof is limited because only a solvent that enables complete dissolution is useful therefor.

SUMMARY

The present disclosure provides a method of manufacturing a composite electrode for an all-solid-state battery, the method including mixing a solid electrolyte precursor and a polar solvent to prepare a precursor solution, which is then stirred and added with an active material to prepare an electrode slurry, followed by heat treatment, thereby synthesizing a solid electrolyte and simultaneously forming a coating layer including the same on the surface of the active material, and a composite electrode for an all-solid-state battery manufactured using the same.

The present disclosure provides a method of manufacturing a composite electrode for an all-solid-state battery, including: preparing a precursor solution by mixing at least one solid electrolyte precursor and at least one polar solvent; stirring the precursor solution; preparing an electrode slurry by adding an active material to the stirred precursor solution; and obtaining a composite electrode for an all-solid-state battery by heat-treating the electrode slurry, in which the composite electrode for an all-solid-state battery includes an active material and a coating layer disposed on the active material and including a solid electrolyte.

The mass ratio of the solid electrolyte precursor to the polar solvent in the precursor solution may be 8-10:1.

The solid electrolyte precursor may include any one selected from the group consisting of $Li_2S$, $P_2S_5$, LiCl, LiBr, and LiI.

The polar solvent may include any one selected from the group consisting of cyclic ether, acetonitrile (ACN), and ethanol (EtOH).

The stirring the precursor solution may be performed at a stirring speed of 250 to 280 rpm.

In the preparing the electrode slurry, the mass ratio of the solid electrolyte precursor to the active material in the electrode slurry may be 1:8-10.

The method may further include preparing an additional precursor solution including an additional solid electrolyte precursor that is different from the solid electrolyte precursor.

The preparing the electrode slurry may include preparing a mixture by adding an active material to the stirred precursor solution, and adding the mixture with an additional precursor solution.

The mass ratio of the solid electrolyte precursor and the additional solid electrolyte precursor to the active material in the electrode slurry may be 1:8-10.

In the preparing the electrode slurry, a conductive agent may be further added in an amount of 0.1 to 0.5 wt % based on a total of 100 wt % of the electrode slurry.

The heat-treating may be performed at 140 to 160° C. for 1 to 3 hours.

In addition, the present disclosure provides a composite electrode for an all-solid-state battery, including an active material and a coating layer disposed on the active material and including a solid electrolyte, in which the coating layer includes an amorphous solid electrolyte.

The solid electrolyte may include $PS_4^{3-}$.

The solid electrolyte may include at least one selected from the group consisting of $Li_3PS_4$, $Li_6PS_5Cl$, $Li_6PS_5ClBr$, and $Li_6PS_5Br$.

The amount of the amorphous solid electrolyte may be 20 to 80 wt % based on a total of 100 wt % of the coating layer.

The coating layer may have a thickness of 200 nm or less.

The coating layer may have a Young's modulus of 18 to 30 GPa.

According to the present disclosure, a method of manufacturing a composite electrode for an all-solid-state battery allows the composition of a solid electrolyte included in a coating layer to be freely changed by changing a solid electrolyte precursor solution, and also of synthesizing a solid electrolyte and simultaneously forming a coating layer including the same on the surface of the active material, thereby improving processing efficiency and generating economic benefits.

In addition, a composite electrode for an all-solid-state battery manufactured using the above method is configured such that the coating layer included therein contains an amorphous solid electrolyte in an appropriate amount, so the contact area between the active material and the coating layer is increased due to the decreased Young's modulus of the coating layer. The all-solid-state battery including the same has advantages of superior battery performance, such as initial discharge capacity and initial lifetime.

The effects of the present disclosure are not limited to the foregoing, and should be understood to include all effects that can be reasonably anticipated from the following description.

DRAWINGS

In order that the disclosure may be well understood, there will now be described various forms thereof, given by way of example, reference being made to the accompanying drawings, in which.

Figure 3A:
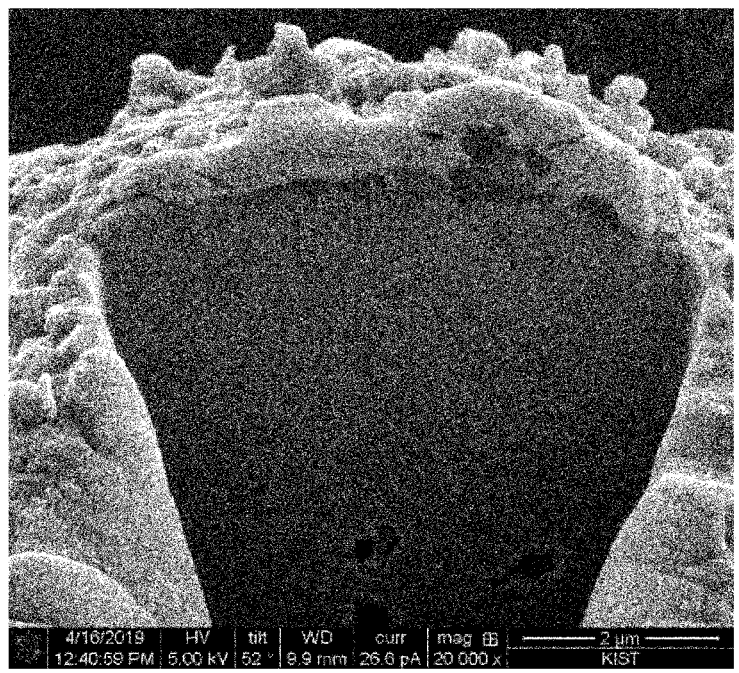
Figure 3B:
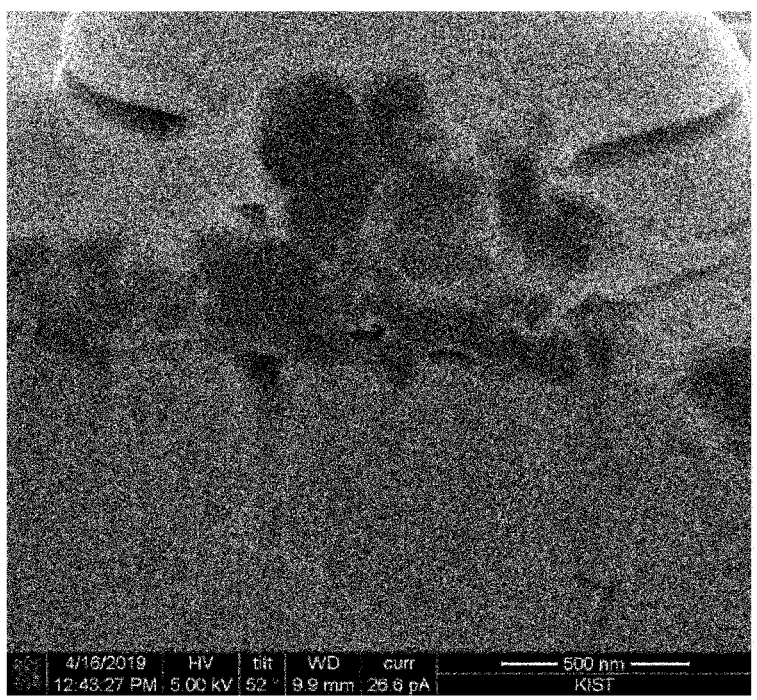
Figure 4:
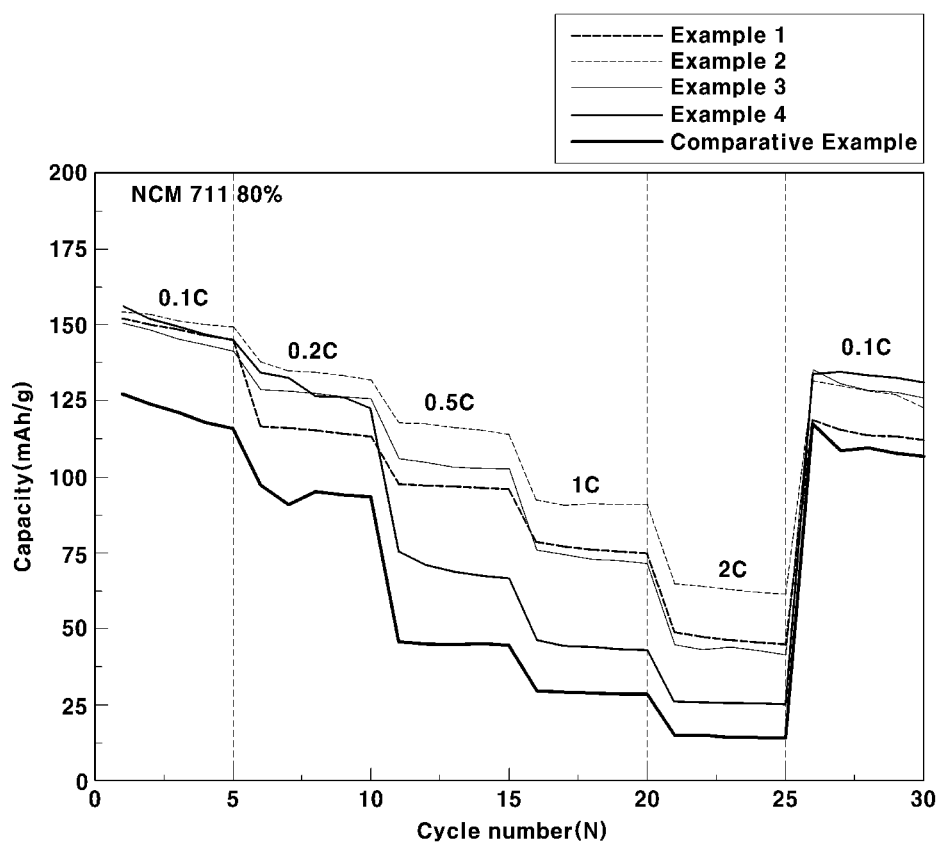

FIG. 3A shows an SEM image of the composite electrode for an all-solid-state battery manufactured in Comparative Example, and FIG. 3B is an enlarged SEM image of the coating layer of the composite electrode for an all-solid-state battery manufactured in Comparative Example; and FIG. 4 is a graph showing the discharge capacity depending on the number of cycles of the all-solid-state battery manufactured using the composite electrode for an all-solid-state battery of each of Examples 1 to 4 and Comparative Example.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited to the forms disclosed herein, and may be modified into different forms. These forms are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

A conventional method of manufacturing an electrode for an all-solid-state battery is diadvantageous in that it is cumbersome because two steps, including preparing a final solid electrolyte through heat treatment and then coating an active material with a solution obtained by dissolving the solid electrolyte in a solvent, are performed, in that the processing time is long, and in that applicability thereof is limited because only a solvent that enables complete dissolution may be selected for use.

Therefore, the inventors of the present disclosure have studied carefully and have ascertained that, when a composite electrode for an all-solid-state battery is obtained by mixing a solid electrolyte precursor and a polar solvent to prepare a precursor solution, which is then stirred and added with an active material to afford an electrode slurry, followed by heat treatment, a solid electrolyte may be synthesized and simultaneously a coating layer including the same may be formed on the surface of the active material, thereby increasing processing efficiency and improving the performance of an all-solid-state battery manufactured using the composite electrode including the same.

Figure 1:
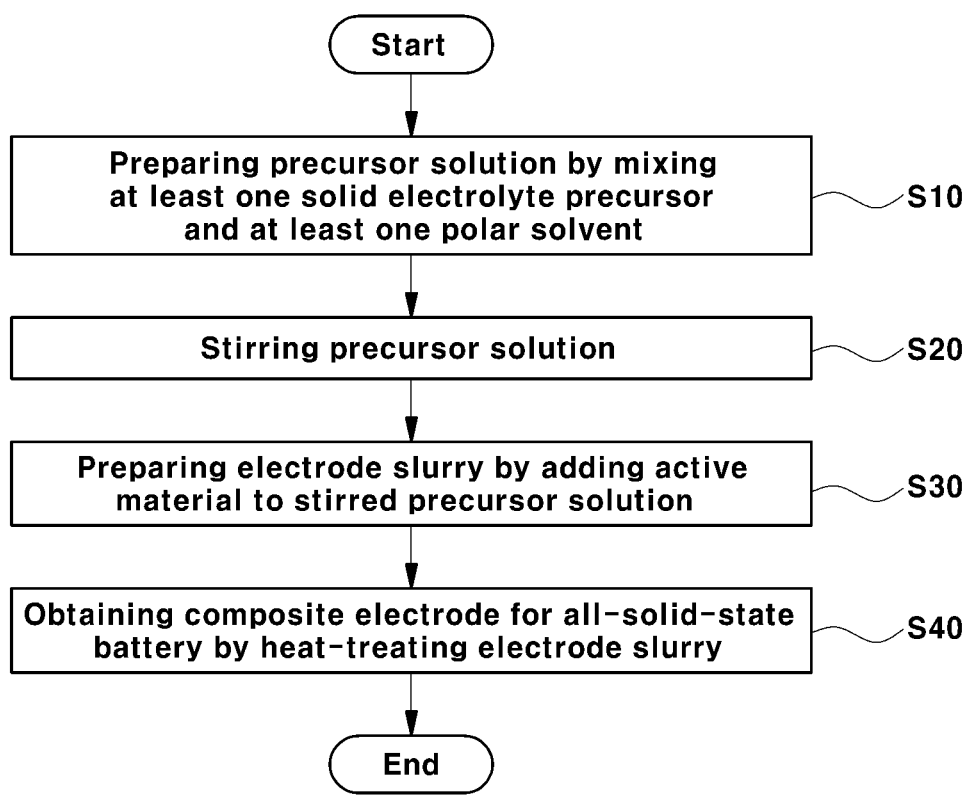
FIG. 1 is a flowchart schematically showing a process of manufacturing a composite electrode for an all-solid-state battery according to one form of the present disclosure.

FIG. 1 is a flowchart schematically showing a process of manufacturing a composite electrode for an all-solid-state battery according to one form of the present disclosure. With reference thereto, the method of manufacturing a composite electrode for an all-solid-state battery includes preparing a precursor solution by mixing at least one solid electrolyte precursor and at least one polar solvent (S10), stirring the precursor solution (S20), preparing an electrode slurry by adding an active material to the stirred precursor solution (S30), and obtaining a composite electrode for an all-solid-state battery by heat-treating the electrode slurry (S40). The composite electrode for an all-solid-state battery thus obtained includes an active material and a coating layer disposed on the active material and including the solid electrolyte.

Preparing the precursor solution (S10) is a step of mixing at least one solid electrolyte precursor of a solid electrolyte to be synthesized and at least one polar solvent capable of dissolving the solid electrolyte precursor to afford a precursor solution.

The solid electrolyte precursor may be a material capable of using a precursor capable of being synthesized into a desired solid electrolyte in the coating layer as a final product, for example, any one selected from the group consisting of $Li_2S$, $P_2S_5$, LiCl, LiBr, and LiI, and does not include only specific substances.

However, the type of the solid electrolyte precursor included in the precursor solution may vary depending on whether or not preparing an additional precursor solution, to be described later, is performed.

Specifically, when not preparing an additional precursor solution, the precursor solution may include at least one solid electrolyte precursor, and preferably includes two or more solid electrolyte precursors. More preferably, the two or more solid electrolyte precursors include $Li_2S$ and $P_2S_5$. Depending on the type of the desired final solid electrolyte, an additional different solid electrolyte precursor may be further added.

Meanwhile, when preparing an additional precursor solution, the precursor solution may include at least one solid electrolyte precursor, and preferably includes a single solid electrolyte precursor. More preferably, the single solid electrolyte precursor includes $P_2S_5$, and a different solid electrolyte precursor to be additionally synthesized may be included in the additional precursor solution.

The precursor solution includes at least one polar solvent, and the polar solvent is not particularly limited, so long as it is one that is capable of dissolving the solid electrolyte precursor to prepare a precursor solution.

Thus, the polar solvent may include any one selected from the group consisting of cyclic ether, acetonitrile (ACN), and ethanol (EtOH), and in particular, the cyclic ether may include tetrahydrofuran, but is not limited to including a specific type.

Preferably, the polar solvent includes one or two types, and when including one or more types, the starting material is almost completely dissolved, and thus cyclic ether may be included. In addition, when including two types, the starting material is almost completely dissolved in the co-solvent system, so acetonitrile (ACN) and ethanol (EtOH) may be included. More preferably, when the polar solvent includes two types, acetonitrile (ACN) and ethanol (EtOH) may be used at a mass ratio of ACN:EtOH=4–5:1. Outside the above range, if the amount of ACN is too small, an extreme reaction between —OH, which is the functional group of EtOH, and the starting material, particularly $P_2S_5$, may occur, whereas if the amount of ACN is too large, the extent of dissolution may be insufficient.

Here, the mass ratio of the solid electrolyte precursor to the polar solvent in the precursor solution may be 8-10:1. Outside the above range, if the amount of the solid electrolyte precursor is too small, a solid electrolyte coating layer may not be formed, whereas if the amount of the solid electrolyte precursor is too large, the resulting solid electrolyte coating layer may be excessively thick.

According to the present disclosure, the method of manufacturing the composite electrode for an all-solid-state battery enables the solid electrolyte precursor in the solid electrolyte precursor solution to be freely changed, thus enabling the composition of the solid electrolyte included in the coating layer to be freely changed, so a solid electrolyte may be synthesized and simultaneously, a coating layer including the same may be formed on the surface of the active material, thereby providing the diversity of the solid electrolyte composition and processing efficiency.

Stirring the precursor solution (S20) is a step of stirring the precursor solution prepared by mixing the solid electrolyte precursor and the polar solvent (S10) to uniformly disperse the same, and is a preparation step for synthesis of a solid electrolyte.

The stirring may be performed through any process selected from the group consisting of typical processes useful in the present disclosure, for example, physical stirring processes, and is not limited to a specific process.

The stirring speed for stirring the precursor solution is a speed at which solid electrolyte precursor particles may uniformly show particle size distribution in a polar solvent, and is preferably 250 to 280 rpm. Outside the above range, if the stirring speed is too low, dissolution and synthesis may not be efficiently performed, whereas if the stirring speed is too high, uniform mixing and synthesis cannot be performed.

Preparing the electrode slurry (S30) is a step of adding an active material to the stirred precursor solution to synthesize a solid electrolyte on the surface of the active material.

The active material is a typical active material useful in the present disclosure, and the type of active material may vary depending on the polarity. For example, for an anode active material, carbon materials such as natural graphite, artificial graphite, graphite carbon fiber, resin-fired carbon and the like, or alloy-based materials that are mixed with a solid electrolyte may be used. Examples of the alloy-based material may include lithium alloys (LiAl, LiZn, $Li_3Bi$, $Li_3Cd$, $Li_3Sb$, $Li_4Si$, $Li_{4.4}Pb$, $Li_{4.4}Sn$, $Li_{0.17}C$, $LiC_6$, etc.), metal oxides such as lithium titanate ($Li_4Ti_5O_{12}$), Zn oxide, etc. Also, a cathode active material may include an oxide active material or a sulfide active material. Examples of the oxide active material may include a rock-salt-layer-type active material such as $LiCoO_2$, $LiMnO_2$, $LiNiO_2$, $LiVO_2$, $Li_{1+x}Ni_{1/3}Co_{1/3}Mn_{1/3}O_2$, $LiNi_{1-x-y}Mn_xCo_yO_2$ (NMC) or the like, a spinel-type active material such as $LiMn_2O_4$, Li$(Ni_{0.5}Mn_{1.5})O_4$ or the like, an inverse-spinel-type active material such as $LiNiVO_4$, $LiCoVO_4$ or the like, an olivine-type active material such as $LiFePO_4$, $LiMnPO_4$, $LiCoPO_4$, $LiNiPO_4$ or the like, a silicon-containing active material such as $Li_2FeSiO_4$, $Li_2MnSiO_4$ or the like, a rock-salt-layer-type active material in which a portion of a transition metal is substituted with a different metal, such as $LiNi_{0.8}Co_{(0.2-x)}Al_xO_2$ (0<x<0.2), a spinel-type active material in which a portion of a transition metal is substituted with a different metal, such as $Li_{1+x}Mn_{2-x-y}M_yO_4$ (M being at least one of Al, Mg, Co, Fe, Ni and Zn, 0<x+y<2), or lithium titanate such as $Li_4Ti_5O_{12}$ or the like. Also, the sulfide active material may be copper chevrel, iron sulfide, cobalt sulfide, nickel sulfide, or the like.

However, the step of preparing the electrode slurry may vary depending on whether an additional precursor solution is prepared.

Specifically, when not preparing an additional precursor solution, as described above, since two or more solid electrolyte precursors are included in the precursor solution, the electrode slurry may be prepared by introducing an active material without separately preparing an additional precursor solution.

Here, through the reaction between solid electrolyte precursors on the surface of the active material, solid electrolyte synthesis may commence. Specifically, since there is surface energy on the surface of the active material, bonding with lithium ions becomes possible, so the synthesis of a solid electrolyte may begin at the time of formation of a seed. In particular, $P_2S_5$, which is a solid electrolyte precursor, may be included as an anion in a solid electrolyte as the final product through the process of Scheme 1 below.

[Scheme 1]

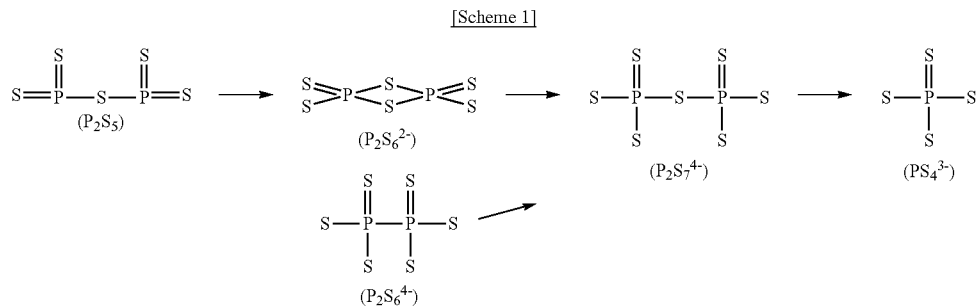

Meanwhile, when preparing an additional precursor solution, the method of the present disclosure may include preparing a mixture by adding an active material to the stirred precursor solution and adding an additional precursor solution to the mixture. Here, preparing the mixture is a step of preparing a mixture by adding an active material to the precursor solution including the single solid electrolyte precursor.

Preparing the additional precursor solution is a step of preparing an additional precursor solution by mixing a polar solvent and a solid electrolyte precursor that is different from the solid electrolyte precursor included in the previously prepared precursor solution. An additional precursor solution including a different solid electrolyte precursor capable of reacting with the solid electrolyte precursor in the previously prepared precursor solution may be prepared and then added to the mixture to react therewith for solid electrolyte synthesis. Except for the type of the solid electrolyte precursor, the method of preparing the additional precursor solution may be the same as the method of preparing the precursor solution described above.

The additional precursor solution may include two or more solid electrolyte precursors in one additional precursor solution, may include one solid electrolyte precursor in each of two or more additional precursor solutions, or may include two or more solid electrolyte precursors in each of two or more additional precursor solutions, without being limited to any specific combination.

The additional precursor solution prepared above may be added to the prepared mixture to produce an electrode slurry. When the additional precursor solution is added, a reaction between the solid electrolyte precursor included in the precursor solution and the solid electrolyte precursor included in the additional precursor solution occurs, whereby a solid electrolyte is synthesized on the surface of the active material. A description related to the synthesis may be the same as the above description.

In this way, the reason for separately preparing and synthesizing an additional precursor solution is that it confers the advantage of enabling more uniform coating by improving the solubility of the electrolyte.

Accordingly, in the prepared electrode slurry, the mass ratio of the solid electrolyte precursor to the active material, when not separately preparing an additional precursor solution, or the mass ratio of the solid electrolyte precursor and the additional solid electrolyte precursor to the active material, when separately preparing an additional precursor solution, may be 1:8-10. Outside the above range, if the amount of the active material is too small, the resulting electrolyte coating layer may be excessively thick, whereas if the amount thereof is too large, the electrolyte coating layer may be formed to be very thin, making it difficult to increase the contact area.

Moreover, in the step of preparing the electrode slurry, a conductive agent may be further added to prepare an electrode slurry.

The conductive agent may be carbon black, conductive graphite, ethylene black, graphene, or the like, and is not limited to including a specific component.

Preferably, the conductive agent is further added in an amount of 0.1 to 0.5 wt % based on a total of 100 wt % of the electrode slurry. Outside the above range, if the amount of the conductive agent is too small, the electron conductive path may not be formed, whereas if the amount of the conductive agent is too large, a non-uniform electron conductive path may be formed due to aggregation of the conductive agent.

In the method of manufacturing the composite electrode for an all-solid-state battery according to the present disclosure, the composition of the solid electrolyte included in the coating layer may be freely changed by changing the solid electrolyte precursor solution, and the coating layer may be formed at the time of synthesizing the solid electrolyte on the surface of the active material, thereby exhibiting superior processing efficiency and generating economic benefits.

Obtaining the composite electrode for an all-solid-state battery (S40) is a step of subjecting the electrode slurry to drying and heat treatment to grow the synthesized solid electrolyte particles to form a coating layer, ultimately obtaining a composite electrode for an all-solid-state battery including the coating layer having a predetermined thickness on the active material.

A drying process may be further performed before heat-treating the prepared electrode slurry. In the drying process, the electrode slurry may be dried in a vacuum at room temperature.

The process of heat-treating the electrode slurry is not particularly limited, so long as it is capable of growing the synthesized solid electrolyte particles, and preferably, heat treatment is performed at a temperature of 140 to 160° C. for 1 to 2 hours. Outside the above range, if the heat treatment temperature is too low, volatilization of the solvent may be insufficient, whereas if the heat treatment temperature is too high, a stable phase having low ionic conductivity may be formed. In addition, if the heat treatment time is too short, volatilization of the solvent may be insufficient, whereas if the heat treatment time is too long, side reactions between the active material and the electrolyte may be induced.

Specifically, as the solid electrolyte particles grow through the heat treatment process, a coating layer including a large amount of an amorphous solid electrolyte, rather than a crystalline solid electrolyte, is formed. As the Young's modulus of the coating layer decreases, the contact area between the active material and the coating layer increases. Thus, an all-solid-state battery manufactured using the composite electrode may exhibit superior battery performance, such as initial discharge capacity and initial lifetime.

In addition, a composite electrode for an all-solid-state battery according to one form of the present disclosure is manufactured using the method described above, and includes an active material and a coating layer disposed on the active material and including a solid electrolyte.

The coating layer may be formed to have a predetermined thickness, and the thickness of the coating layer may be 200 nm or less, and preferably 170 to 195 nm. Outside the above range, if the thickness of the coating layer is too large, the electron conductive path between the active material and the electrolyte may not be efficiently formed.

The coating layer may include a crystalline solid electrolyte and an amorphous solid electrolyte at an appropriate ratio, and preferably includes a large amount of an amorphous solid electrolyte. More preferably, the amount of the amorphous solid electrolyte is 20 to 80 wt % based on a total of 100 wt % of the coating layer. Outside the above range, if the amount of the amorphous solid electrolyte is too small, the Young's modulus of the coating layer may increase, and thus the contact area between the active material and the coating layer may decrease.

The coating layer may include a solid electrolyte including $PS_4^{3-}$, and preferably, the solid electrolyte includes at least one selected from the group consisting of $Li_3PS_4$ and $Li_6PS_5Cl$.

Specifically, in the composite electrode for an all-solid-state battery manufactured using the above manufacturing method, the amount of the amorphous solid electrolyte in the coating layer included therein is increased, so the Young's modulus of the coating layer is lowered to about 18 to 30 GPa, and the contact area between the active material and the coating layer is increased, whereby the all-solid-state battery including the same exhibits superior battery performance, such as initial discharge capacity and initial lifetime.

A better understanding of the present disclosure may be obtained through the following examples. However, these examples are merely set forth to illustrate the present disclosure, and are not to be construed as limiting the scope of the present disclosure.

Example 1: Manufacture of Composite Electrode for all-Solid-State Battery without Preparing Additional Precursor Solution (S10) Tetrahydrofuran, which is cyclic ether, serving as a polar solvent, and $Li_2S$ and $P_2S_5$, serving as solid electrolyte precursors, were mixed and dissolved to prepare a precursor solution. Here, the mass ratio of the solid electrolyte precursor to the polar solvent in the precursor solution was 9:1.

(S20) The precursor solution was heated at a heating rate of 1° C./min and then stirred at 50° C. at a stirring speed of 250 to 280 rpm using a stirrer for 1 to 5 minutes.

(S30) The precursor solution was added with an active material and then stirred for 5 to 24 hours to prepare an electrode slurry. Here, the solid electrolyte precursor and the active material were added at a mass ratio of 1:9, and a conductive agent was further added in an amount of 0.1 to 0.5 wt % based on a total of 100 wt % of the electrode slurry.

(S40) The electrode slurry was dried in a vacuum at room temperature, followed by heat treatment at 150° C. for 1 to 2 hours, ultimately obtaining a composite electrode including a coating layer including a solid electrolyte on the surface of the active material.

Example 2: Manufacture of Composite Electrode for all-Solid-State Battery by Preparing One Additional Precursor Solution A composite electrode for an all-solid-state battery was manufactured in the same manner as in Example 1, with the exception that a precursor solution was prepared by including only $P_2S_5$ as a solid electrolyte precursor, and an additional precursor solution was prepared by including $Li_2S$ as an additional solid electrolyte precursor, and was then further added upon preparation of the electrode slurry.

Example 3: Manufacture of Composite Electrode for all-Solid-State Battery by Preparing Two Additional Precursor Solutions A composite electrode for an all-solid-state battery was manufactured in the same manner as in Example 2, with the exception that another additional precursor solution was prepared by including LiCl as an additional solid electrolyte precursor, and was then further added upon preparation of the electrode slurry.

Example 4: Manufacture of Composite Electrode for all-Solid-State Battery without Preparing Additional Precursor Solution A composite electrode for an all-solid-state battery was manufactured in the same manner as in Example 1, with the exception that, upon preparation of the precursor solution, acetonitrile (ACN) and ethanol (EtOH) were used at a mass ratio of 4-5:1 as the polar solvent, rather than tetrahydrofuran.

Comparative Example: Manufacture of Composite Electrode Using Synthesized Solid Electrolyte A composite electrode for an all-solid-state battery was manufactured in the same manner as in Example 1, with the exception that a solid electrolyte solution, in which argyrodite electrolyte ($Li_6PS_5Cl$, $Li_6PS_5BrxClx$, $Li_6PS_5Br$) subjected to heat treatment after synthesis was mixed with ethanol (EtOH), was prepared, rather than the precursor solution.

Test Example 1: Analysis of Coating Layer of Composite Electrode for all-Solid-State Battery A composite electrode was manufactured according to Examples 1 to 4 and Comparative Example, and the coating layer in the composite electrode was analyzed based on SEM images using a scanning electron microscope (SEM).

Figure 2A:
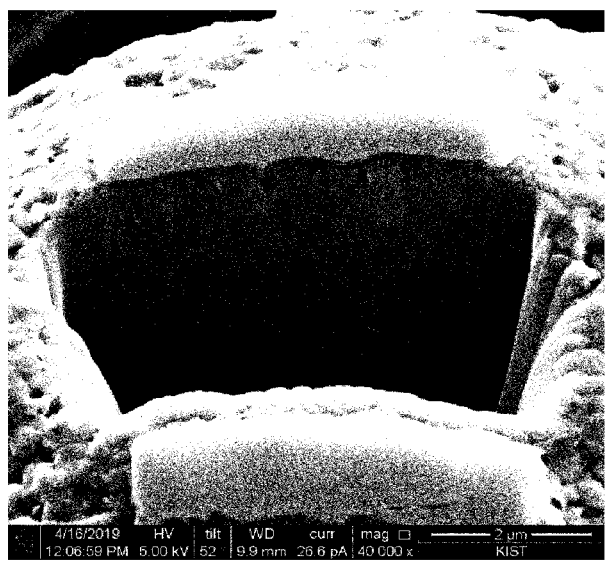
FIG. 2A shows an SEM image of the composite electrode for an all-solid-state battery manufactured in Example 2.
Figure 2B:
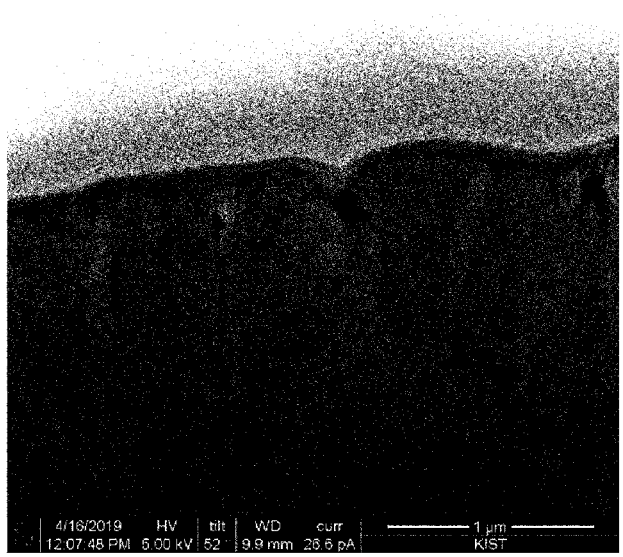
FIG. 2B is an enlarged SEM image of the coating layer of the composite electrode for an all-solid-state battery manufactured in Example 2.

Specifically, FIG. 2A shows an SEM image of the composite electrode for an all-solid-state battery manufactured in Example 2, and FIG. 2B is an enlarged SEM image of the coating layer of the composite electrode for an all-solid-state battery manufactured in Example 2. Also, FIG. 3A shows an SEM image of the composite electrode for an all-solid-state battery manufactured in Comparative Example, and FIG. 3B is an enlarged SEM image of the coating layer of the composite electrode for an all-solid-state battery manufactured in Comparative Example.

With reference to FIGS. 2A and 2B, it was confirmed that the coating layer of the composite electrode according to Example 2, manufactured using the manufacturing method according to the present disclosure, was formed to have a small and uniform thickness. In contrast, with reference to FIGS. 3A and 3B, it was confirmed that the coating layer of the composite electrode according to Comparative Example was formed to have a large and irregular thickness.

In addition, based on the SEM images, the thickness of the coating layer and the Young's modulus of the coating layer were analyzed, and the results thereof are shown in Table 1 below.

TABLE 1

| Classification | Young's modulus of coating layer (GPa) | Thickness (nm) |
|---|---|---|
| Example 1 | 18 | 185 |
| Example 2 | 18 | 190 |
| Example 3 | 20 | 192 |
| Example 4 | 19 | 186 |
| Comparative Example | 25 | 230 |

* Young's modulus: Measurement of dynamic modulus of elasticity of a material through a resonance method using ultrasonic resonance As is apparent from Table 1, it was confirmed that the thickness of the composite electrode of each of Examples 1 to 4 manufactured according to the present disclosure was small, particularly 200 nm or less, and that the Young's modulus thereof was low, particularly 22-25 GPa. Specifically, in the composite electrode for an all-solid-state battery manufactured according to the present disclosure, which improves processing efficiency by synthesizing a solid electrolyte and simultaneously forming a coating layer including the same on the surface of an active material, the coating layer has a uniform and small thickness and includes an amorphous solid electrolyte in an appropriate amount, so the Young's modulus thereof is low, and thus the contact area between the active material and the coating layer is increased.

Test Example 2: Evaluation of Change/Discharge Characteristics of Composite Electrode for all-Solid-State Battery The composite electrode of each of Examples 1 to 4 and Comparative Example was manufactured, after which an all-solid-state half-cell was manufactured from the composite electrode, and the initial discharge capacity and lifetime thereof were analyzed to evaluate charge/discharge characteristics. The results thereof are shown in Table 2 below.

TABLE 2

| Classification | Initial (1$^{st}$) discharge capacity (mAh/g) | Lifetime (%, @25 cycles) |
|---|---|---|
| Example 1 | 152.33 | 29.53 |
| Example 2 | 154.67 | 39.85 |
| Example 3 | 150.75 | 27.66 |

TABLE 2-continued

| Classification | Initial (1$^{st}$) discharge capacity (mAh/g) | Lifetime (%, @25 cycles) |
|---|---|---|
| Example 4 | 155.88 | 16.21 |
| Comparative Example | 127.46 | 11.02 |

* Evaluation of charge/discharge characteristics: Evaluation of rate-limiting characteristics by manufacturing an all-solid-state Li half-cell FIG. 4 is a graph showing the discharge capacity depending on the number of cycles of the all-solid-state battery manufactured using the composite electrode of each of Examples 1 to 4 and Comparative Example. With reference to Table 2 and FIG. 4, the initial discharge capacity of the all-solid-state battery manufactured using the composite electrode of each of Examples 1 to 4 according to one form of the present disclosure was higher than that of the all-solid-state battery manufactured using the composite electrode according to a conventional manufacturing method. Also, the lifetime of the all-solid-state battery manufactured using the composite electrode of each of Examples 1 to 4 according to one form of the present disclosure was higher than that of the all-solid-state battery manufactured using the composite electrode according to a conventional manufacturing method.

Specifically, in the composite electrode for an all-solid-state battery manufactured according to the present disclosure, which improves processing efficiency by synthesizing a solid electrolyte and simultaneously forming a coating layer including the same on the surface of an active material, the coating layer has a uniform and small thickness and includes an amorphous solid electrolyte in a large amount, so the Young's modulus thereof is low, and the contact area between the active material and the coating layer is increased. Therefore, the all-solid-state battery including the composite electrode can exhibit superior battery performance, such as initial discharge capacity and initial lifetime.

What is claimed is:

1. A method of manufacturing a composite electrode for an all-solid-state battery, the method comprising:
    preparing a precursor solution by mixing at least one solid electrolyte precursor and at least one polar solvent;
    stirring the precursor solution;
    preparing an electrode slurry by adding an active material to the stirred precursor solution; and
    heat-treating the electrode slurry and obtaining the composite electrode for the all-solid-state battery,
    wherein the composite electrode for the all-solid-state battery comprises: the active material; and a coating layer disposed on the active material and including a solid electrolyte, and
    wherein a mass ratio of the solid electrolyte precursor to the polar solvent in the precursor solution is 8-10:1.

2. The method of claim 1, wherein the solid electrolyte precursor comprises any one selected from a group consisting of $Li_2S$, $P_2S_5$, LiCl, LiBr, LiI, and a mixture thereof.

3. The method of claim 1, wherein the polar solvent comprises any one selected from a group consisting of cyclic ether, acetonitrile (ACN), ethanol (EtOH), and a mixture thereof.

4. The method of claim 1, wherein stirring the precursor solution is performed at a stirring speed of 250 to 280 rpm.

5. The method of claim 1, wherein, in preparing the electrode slurry, a mass ratio of the solid electrolyte precursor to the active material in the electrode slurry is 1:8-10.

6. The method of claim 1, further comprising preparing an additional precursor solution including an additional solid electrolyte precursor that is different from the solid electrolyte precursor.

7. The method of claim 6, wherein preparing the electrode slurry comprises:
  preparing a mixture by adding the active material to the stirred precursor solution; and
  adding the mixture with the additional precursor solution.

8. The method of claim 7, wherein a mass ratio of the solid electrolyte precursor and the additional solid electrolyte precursor to the active material in the electrode slurry is 1:8-10.

9. The method of claim 1, wherein, in preparing the electrode slurry, a conductive agent is further added in an amount of 0.1 to 0.5 wt % based on a total of 100 wt % of the electrode slurry.

10. The method of claim 1, wherein heat-treating is performed at 140 to 160° C. for 1 to 3 hours.

* * * * *